US008959622B2

(12) United States Patent
Bajekal

(10) Patent No.: US 8,959,622 B2
(45) Date of Patent: *Feb. 17, 2015

(54) ENABLING ACCESS TO A SUBSET OF DATA

(71) Applicant: International Business Machines Corporation, Armonk, NY (US)

(72) Inventor: Sadanand R. Bajekal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,650

(22) Filed: Jan. 15, 2014

(65) Prior Publication Data

US 2014/0130147 A1  May 8, 2014

Related U.S. Application Data

(63) Continuation of application No. 12/353,329, filed on Jan. 14, 2009, now Pat. No. 8,650,634.

(51) Int. Cl.
*G06F 21/00* (2013.01)
*G06F 21/30* (2013.01)
*G06F 21/62* (2013.01)

(52) U.S. Cl.
CPC ............ *G06F 21/30* (2013.01); *G06F 21/6227* (2013.01); *G06F 2221/2117* (2013.01); *G06F 2221/2141* (2013.01)
USPC ........................................... 726/19; 707/770

(58) Field of Classification Search
CPC .................... G06F 21/6227; G06F 2221/2117; G06F 2221/2141; G06F 17/30575; H04L 9/32; H04L 67/1095
USPC ........................................... 726/19; 707/770
See application file for complete search history.

(56) References Cited

U.S. PATENT DOCUMENTS

| 7,765,229 | B2 * | 7/2010 | Samji et al. .................... 707/770 |
| 2003/0126162 | A1 | 7/2003 | Yohe et al. |
| 2003/0208598 | A1 * | 11/2003 | Athey et al. .................... 709/226 |
| 2004/0224674 | A1 | 11/2004 | O'Farrell et al. |

(Continued)

FOREIGN PATENT DOCUMENTS

WO     WO2005052720 A2     6/2005

OTHER PUBLICATIONS

Samarati et al, Maintaining replicated authorizations in distributed database, 1996, Data & Knowledge Engineering, 55-84.*
Office Action, dated Oct. 27, 2011, regarding U.S. Appl. No. 12/353,329, 22 pages.

(Continued)

*Primary Examiner* — Kambiz Zand
*Assistant Examiner* — Ali Shayanfar
(74) *Attorney, Agent, or Firm* — Yee & Associates, P.C.; Jeffrey S. LaBaw

(57) ABSTRACT

A method includes receiving, at a computing device, one or more replicated authorization databases. At least one of the one or more replicated authorization databases corresponds to a subscription to access selected data. The selected data is aggregated from a plurality of sources. The method also includes storing the one or more replicated authorization databases at the computing device. The method also includes determining, via the replicated authorization databases, user permission to access the selected data via the computing device. The method also includes enabling access to the selected data at the computing device after determining the user permission to access the selected data.

11 Claims, 7 Drawing Sheets

(56) References Cited

U.S. PATENT DOCUMENTS

| | | |
|---|---|---|
| 2006/0048224 A1 | 3/2006 | Duncan |
| 2006/0212486 A1 | 9/2006 | Kennis |
| 2007/0239471 A1 | 10/2007 | Patton et al. |
| 2008/0052319 A1* | 2/2008 | Dunning et al. ........... 707/104.1 |
| 2010/0180337 A1 | 7/2010 | Bajekal |
| 2010/0191884 A1* | 7/2010 | Holenstein et al. ........... 710/200 |

OTHER PUBLICATIONS

Office Action, dated Jun. 14, 2012, regarding U.S. Appl. No. 12/353,329, 21 pages.
Final Office Action, dated Jan. 7, 2013, regarding U.S. Appl. No. 12/353,329, 51 pages.
Notice of Allowance, dated Sep. 27, 2013, regarding U.S. Appl. No. 12/353,329, 21 pages.

* cited by examiner

ENABLING ACCESS TO A SUBSET OF DATA

CROSS-REFERENCE TO RELATED APPLICATIONS

This application is a continuation of U.S. patent application Ser. No. 12/353,329, filed on Jan. 14, 2009, status Allowed.

I. FIELD

The present disclosure is generally related to enabling access to a subset of data.

II. BACKGROUND

Data providers, such as Bloomberg and Reuters-Thomson, aggregate data related to a particular industry from different sources and offer access to a subset of the data via a subscription. For example, the aggregated data may include financial market data, legal data, health care data, technology data, science data, and government data. To illustrate, a subscription to financial market data may include streaming real-time quotes for all securities listed on the New York Stock Exchange (NYSE). For financial market data, access to the data may be provided using a specialized computer terminal, such as a Bloomberg terminal or a Reuters terminal, to enable access to a subset of the financial market data via the subscription. When a financial trader attempts to access the financial market data, the terminal may determine whether the financial trader has a subscription that enables the financial trader to access the financial market data and then allows or denies access to the financial market data accordingly.

The subscription information is typically managed by the data provider. One way the terminal can determine whether the financial trader has a subscription to access a portion of the financial market data is for the terminal to send a request to the data provider asking whether the financial trader has a subscription to access the financial market data and then allow or deny access to the financial market data accordingly. However, the exchange of messages between the terminal and the data provider may result in a delay before the financial trader is allowed to access the requested financial market data. In addition, the work load for the data provider increases because the data provider is repeatedly checking whether each financial trader can access a particular portion of the financial market data.

Another way to determine whether the financial trader has a subscription to access a portion of the financial data is to create a local copy of the master authorization database at each terminal. However, copying a large master authorization database to many terminals takes time and results in the master authorization database occupying a large portion of memory at the terminal. In addition, each time a trader changes his or her subscription, or the data provider offers new or updated packaged financial-products, the trader cannot access the financial market data associated with the new subscription until the master authorization database with the new subscription information is copied to the trader's terminal.

III. BRIEF SUMMARY

In a particular embodiment, a method includes receiving, at a computing device, one or more replicated authorization databases. At least one of the one or more replicated authorization databases corresponds to a subscription to access selected data. The selected data is aggregated from a plurality of sources. At least a portion of the selected data is real-time subscription data. The method also includes storing the one or more replicated authorization databases at the computing device. The method also includes determining, via the replicated authorization databases, user permission to access the selected data via the computing device. The method also includes enabling access to the selected data at the computing device after determining the user permission to access the selected data.

In another particular embodiment, a method includes partitioning an ontology data structure having multiple domains to create a set of authorization databases. Each of the authorization databases is associated with a user subscription type. The method also includes identifying, based at least partially on a first user profile, entitlement rights of a first user to access a subset of data, the data aggregated from a plurality of sources. At least a portion of the data is aggregated substantially in real-time. The method also includes identifying a first subset of authorization databases. The first subset of authorization databases includes at least one but not all databases in the set of authorization databases. The first subset of authorization databases is selected based on a subscription associated with the first user. The first subset of authorization databases includes permissions to access the subset of data. The method also includes selectively replicating the first subset of authorization databases to a first computing device associated with the first user.

In another particular embodiment, a system includes a network interface to communicate with a remote computing device via a network. The network interface is configured to receive a login notification from a computing device associated with a user. The system also includes a directory services server including user information associated with entitlements of each of a plurality of users to access a subset of data, where the user information includes a user profile. The system also includes a policy server coupled to the directory services server. The policy server includes a set of policies useable to determine entitlements for a particular user based on a user profile of the particular user. The policy server further identifies a subset of authorization databases from a set of authorization databases based on the entitlements. The system also includes an access manager to replicate the subset of authorization databases to the remote computing device to enable user access of the particular user to the subset of data.

In another particular embodiment, a computer program product including a computer usable medium having computer usable program code is disclosed. The computer usable program code is configured to identify entitlements of a user to access selected data. The computer usable program code is further configured to identify one or more authorization databases from a set of authorization databases based on the entitlements of the user. The computer usable program code is further configured to replicate the one or more authorization databases to a computing device associated with the user.

IV. BRIEF DESCRIPTION OF THE DRAWINGS

V. DETAILED DESCRIPTION

Figure 1:
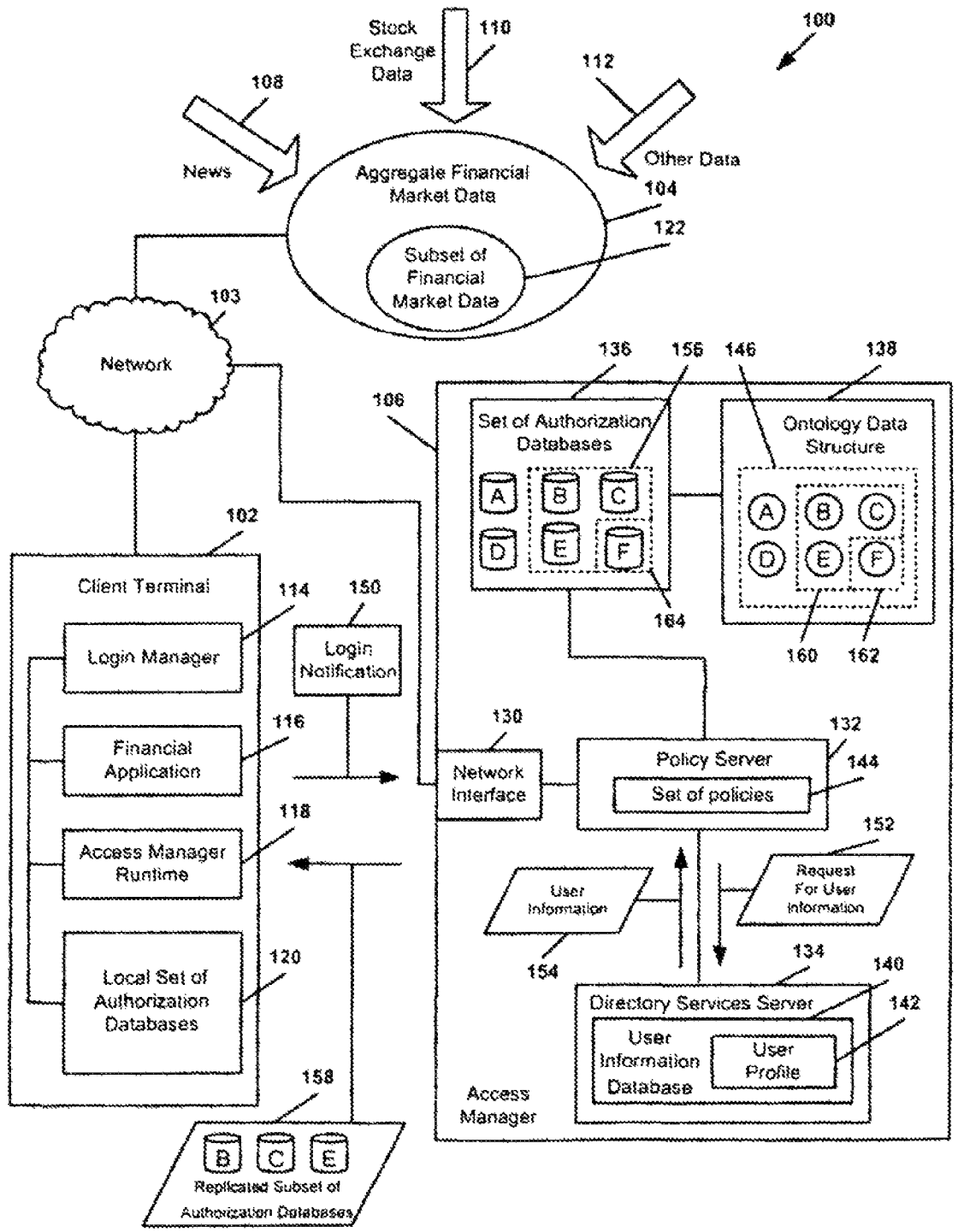
FIG. 1 is a block diagram of a first embodiment of a system to enable access to a subset of data.
Figure 2:
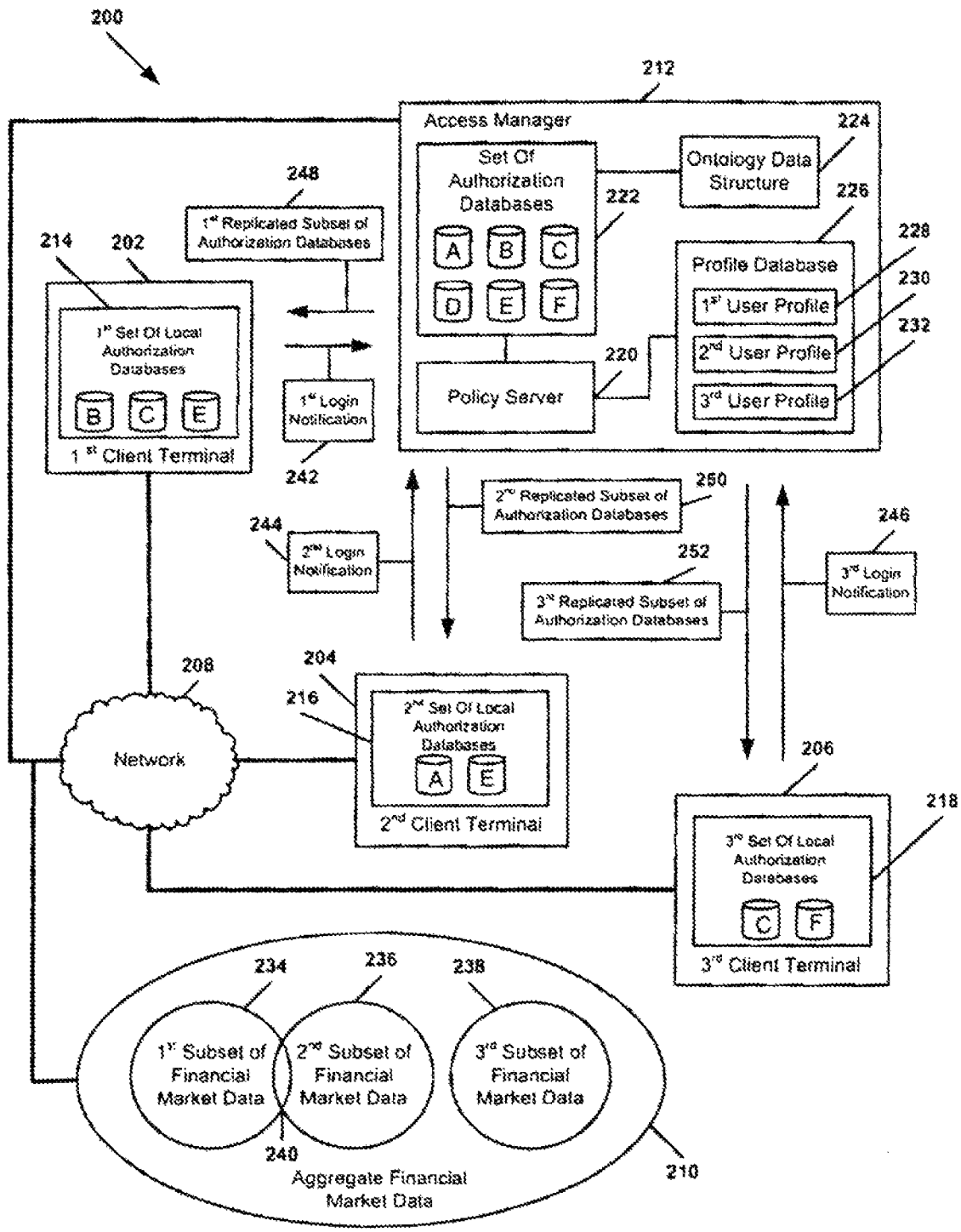
FIG. 2 is a block diagram of a second embodiment of a system to enable access to a subset of data.
Figure 3:
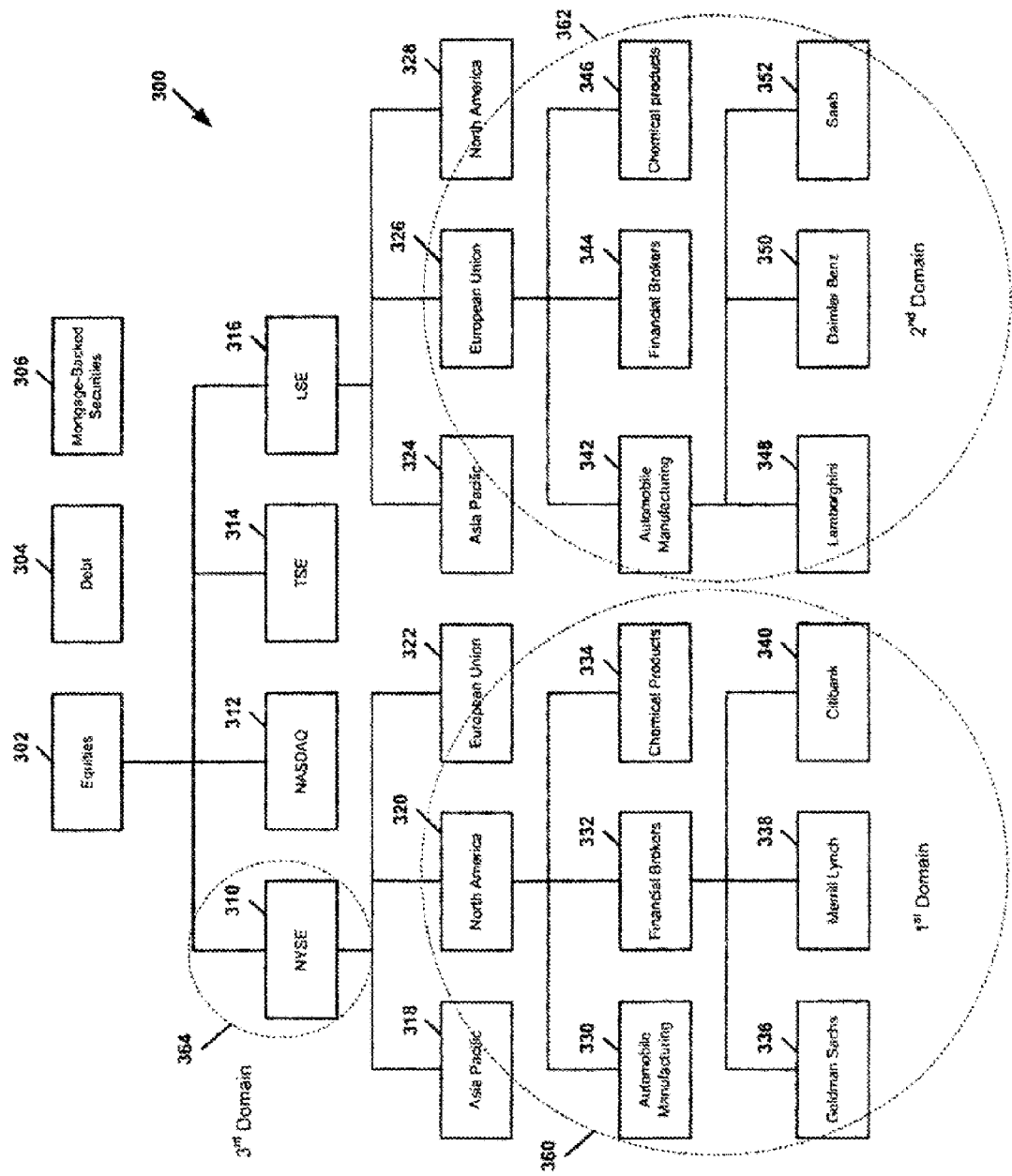
FIG. 3 is a block diagram of an illustrative embodiment of a hierarchical ontology data structure.

FIG. 1 is a block diagram of a particular embodiment of a system 100 to enable access to a subset of data. In the system 100, a client terminal 102 is coupled via a network 103 to aggregate subscription data, such as financial market data 104, and to an access manager 106. The aggregate financial market data 104 includes news 108, stock exchange data 110, and other data 112. In an illustrative embodiment, the other data 112 includes financial market data analysis data. In a particular embodiment, at least a portion of the aggregate financial market data 104 may be aggregated substantially in real-time. For example, the stock exchange data 110 may include stock quotes that are received from a stock exchange in real-time, i.e. within ten seconds of the corresponding stock having a particular price at a particular time. The aggregate financial market data 104 includes a subset of financial market data 122. In FIG. 1-3 financial market data is used to illustrate how a subscription to access a subset of data may be implemented. Alternative embodiments may be used to enable access to subsets of other types of data, such as accounting data, engineering data, healthcare data, science data, technology data, government data, other industry-related data, or any combination thereof.

The client terminal 102 includes a login manager 114, a financial application 116, an access manager runtime 118, and a local set of authorization databases 120. The client terminal 102 may be a computing device, such as a personal computer, a Bloomberg terminal, or a Reuters terminal. The login manager 114 is configured to send a login notification 150 to the access manager 106 after a user logs in at the client terminal 102. The access manager runtime 118 is configured to receive the local set of authorization databases 120 from the access manager 106 after the login manager 114 sends the login notification 150. The financial application 116 is configured to access the subset of financial market data 122 based on the local set of authorization databases 120.

The access manager 106 includes a network interface 130, a policy server 132, a directory services server 134, a set of authorization databases 136, and an ontology data structure 138. In a particular embodiment, the access manager 106 is implemented using Tivoli® Access Manager. The network interface 130 is configured to communicate with a remote computing device, such as the client terminal 102, via the network 103. The network interface 130 is further configured to receive the login notification 150, from the client terminal 102. The directory services server 134 includes a user information database 140 that includes user information associated with entitlements of each of a plurality of users to access a portion of the aggregate financial market data 104. The user information includes a user profile 142 that may include information that identifies a user subscription type. In a particular embodiment, the directory services server 134 is implemented via a lightweight directory access protocol (LDAP) server.

The policy server 132 is coupled to the directory services server 134 and includes a set of policies 144. The policy server 132 is configured to use the set of policies 144 to determine entitlements for a particular user, based on the user profile 142 of the particular user. The policy server 132 is further configured to identify a subset of authorization databases 156 of the set of authorization databases 136 based on the user entitlements and to define actions that the particular user is permitted to perform with respect to the subset of authorization databases 156. The access manager 106 is configured to replicate the subset of authorization databases 156 and send a replicated subset of authorization databases 158 to the client terminal 102 to enable the particular user to access the subset of financial market data 122.

The ontology data structure 138 is a representation of the aggregate financial market data 104. In a particular embodiment, the ontology data structure 138 is organized as a hierarchical tree structure, as illustrated in FIG. 3. The ontology data structure 138 may be partitioned into a plurality of domains 146 to create the set of authorization databases 136. The ontology data structure 138 may be logically partitioned based on at least one of a stock exchange, a financial instrument class, a financial instrument type, a symbol of a financial instrument, or a geographic classification, as discussed in more detail below. The plurality of domains 146 may be distinct from each other or at least two of the domains may overlap. Each authorization database of the set of authorization databases 136 is associated with a user subscription type. For example, when a domain is defined to include all automobile manufacturers having their headquarters in North America and listed on the New York Stock Exchange (NYSE), the authorization database corresponding to the defined domain enables a user to access the financial market data of all North American based automobile manufacturers listed on the NYSE by the appropriate type of subscription. In a particular embodiment, a first subset of the plurality of domains 160 is associated with the first subset of the authentication databases 156 and a second subset of the plurality of domains 162 is associated with a second subset of the authentication databases 164. In a particular embodiment, users are subdivided into groups of users and a user subscription type is associated with each group of users so that each user of a group has the same user subscription type and the same access privileges as other users of the group.

In operation, after a user log in, the login manager 114 sends the login notification 150 to the access manager 106. The login notification 150 is associated with a user of the client terminal 102. In response to the login notification 150, the policy server 132 sends a request for user information 152 to the directory services server 134. The directory services server 134 receives the request for user information 152, retrieves the user profile 142 from the user information database 140, and sends the user information 154 to the policy server 132. In an illustrative embodiment, the user information 154 that is sent to the policy server 132 includes the user profile 142.

The policy server 132 receives the user information 154 and identifies, based at least partially on the user profile 142, entitlement rights of the user to access the subset of financial market data 122. The policy server 132 identifies a first subset of authorization databases 156 of the set of authorization databases 136 based on the entitlement rights of the user and based on the set of policies 144. The first subset of authorization databases 156 includes at least one but not all databases in the set of authorization databases 136. Each of the authorization databases in the set of authorization databases 136 includes permissions to access a portion of the aggregate financial market data 104. For example, the first subset of authorization databases 156 may include permissions to access the subset of financial market data 122. The policy server 132 replicates the first subset of authorization databases 156 and sends the replicated subset of authorization databases 158 to the client terminal 102. The client terminal 102 receives and stores the replicated subset of authorization databases 158 at the local set of authorization databases 120.

When a user of the client terminal 102 attempts to access the subset of financial market data 122, the access manager runtime 118 determines whether the user is authorized to access the subset of financial market data 122 via the set of local authorization databases 120. For example, the set of local authorization databases 120 may include information related to user subscriptions to access portions of the aggregate financial market data 104. When the set of local authorization databases 120 indicates that the user of the client terminal 102 is authorized to access the subset of financial market data 122, then the user is granted access to the subset of financial market data 122. When the set of local authorization databases 120 indicates that the user of the client terminal 102 is not authorized to access the subset of financial market data 122, then the user is denied access to the subset of financial market data 122.

By replicating the first subset of authorization databases 156 and storing them at the set of local authorization databases 120 of the client terminal 102, the client terminal 102 can quickly determine which portions of the aggregate financial market data 104 a user is authorized to access. The client terminal 102 does not send messages to an external entity, such as a subscription enforcement gateway to the aggregate financial market data 104, to determine which portions of the aggregate financial market data 104 a user is authorized to access in response to every user request to access data. Nor does the client terminal 102 periodically synchronize the local set of authorization databases 120 with the entire set of authorization databases 136 because the replicated subset of authorization databases 158 are replicated based on the user profile 142. Instead, when a user changes his or her subscription to access a portion of the aggregate financial market data 104, the client terminal 102 may periodically receive a new authorization database or an updated replicated subset of authorization databases 158.

FIG. 2 is a block diagram of a second embodiment of a system 200 to enable access to a subset of data. The system 200 includes a first client terminal 202, a second client terminal 204, and a third client terminal 206, each coupled to a network 208. The network 208 is also coupled to aggregate financial market data 210 and to an access manager 212.

The first client terminal 202 includes a first set of local authorization databases 214. The second client terminal 204 includes a second set of local authorization databases 216. The third client terminal 206 includes a third set of local authorization databases 218. The access manager 212 includes a policy server 220, a set of authorization databases 222, an ontology data structure 224, and a profile database 226. In the embodiment shown, the profile database 226 includes a first user profile 228, a second user profile 230, and a third user profile 232. The aggregate financial market data 210 includes a first subset of financial market data 234, a second subset of financial market data 236, and a third subset of financial market data 238. The first subset of financial market data 234 and the second subset of financial market data 236 have an overlap 240.

The first client terminal 202 is configured to send a first login notification 242 to the access manager 212 when a first user logs in. The first client terminal 202 is further configured to receive a first replicated subset of authorization databases 248 from the access manager 212. The second client terminal 204 is configured to send a second login notification 244 to the access manager 212 when a second user logs in. The second client terminal 204 is further configured to receive a second replicated subset of authorization databases 250 from the access manager 212. The third client terminal 206 is configured to send a third login notification 246 to the access manager 212 when a third user logs in. The third client terminal 206 is further configured to receive a third replicated subset of authorization databases 252 from the access manager 212.

The access manager 212 is configured to receive the login notifications 242, 244, and 246 from the client terminals 202, 204, and 206, respectively. The access manager 212 is further configured to identify a subset of the set of authorization databases 222 based on the user profiles 228, 230, and 232 and to send the subset of replicated authorization databases 248, 250, and 252 to the client terminals 202, 204, and 206, respectively.

In operation, when a first user logs in to the first client terminal 202, the access manager 212 receives the first login notification 242 from the first client terminal 202. The access manager 212 looks up the first user profile 228 in the profile database 226 and identifies a subset of the set of authorization databases 222 based on the first user profile 228. The access manager 212 replicates and sends the first replicated subset of authorization databases 248 to the first client terminal 202. The first client terminal 202 stores the first replicated subset of authorization databases 248 at the first set of local authorization databases 214. When the first user attempts to access a portion of the aggregate financial market data 210, the first set of local authorization databases 214 are used to determine that the first user can access the first subset of financial market data 234.

When a second user logs in to the second client terminal 204, the access manager 212 receives the second login notification 244 from the second client terminal 204. The access manager 212 looks up the second user profile 230 in the profile database 226 and identifies a subset of the set of authorization databases 222 based on the second user profile 230. The access manager 212 replicates and sends the second replicated subset of authorization databases 250 to the second client terminal 204. In a particular embodiment, replicating the second replicated subset of authorization databases 250 is performed substantially simultaneously with replicating the first replicated subset of authorization databases 248. The second client terminal 204 stores the second replicated subset of authorization databases 250 at the second set of local authorization databases 216. When the second user attempts to access a portion of the aggregate financial market data 210, the second set of local authorization databases 216 are used to determine that the second user can access the second subset of financial market data 236.

When a third user logs in to the third client terminal 206, the access manager 212 receives the third login notification 246 from the third client terminal 206. The access manager 212 looks up the third user profile 232 in the profile database 226 and identifies a subset of the set of authorization databases 222 based on the third user profile 232. The access manager 212 replicates and sends the third replicated subset of authorization databases 252 to the third client terminal 206. In a particular embodiment, replicating the third replicated subset of authorization databases 252 is performed substantially simultaneously with replicating the first replicated subset of authorization databases 248. The third client terminal 206 stores the third replicated subset of authorization databases 252 at the third set of local authorization databases 218. When the third user attempts to access a portion of the aggregate financial market data 210, the third set of local authorization databases 218 are used to determine that the third user can access the third subset of financial market data 238.

By identifying a subset of the set of authorization databases 222 based on a particular user profile in the profile database 226 and replicating and storing the subset of authorization databases locally at a client terminal, the client terminals 202, 204, and 206 can quickly and easily determine which portions of the aggregate financial market data 210 a particular user can access. The subset of the set of authorization databases 222 are selectively replicated and stored when a user logs in and before the user requests access to a portion of the aggregate financial market data 210. The client terminals 202, 204, and 206 can determine which of the subsets of financial market data 234, 236, and 238 the user can access without having to send messages to an external entity for every user request to access data and without having to store a copy of the entire set of authorization databases 222 locally. The sets of local authorization databases 214, 216, and 218 are each smaller than the set of authorization databases 222 because the sets of local authorization databases 214, 216, and 218 are selectively replicated based on a user profile in the profile database 226 and therefore customized for each user. When a user purchases a new subscription to a portion of the aggregate financial market data 210, or when the subscription data content changes, the access manager 212 selectively replicates and sends a new authorization database to the user's client terminal to enable the user to access the financial market data associated with the new subscription. Thus, the subset of local authorization databases 214, 216, and 218 can be quickly and easily changed to reflect each user's current subscriptions to financial market data.

FIG. 3 is a block diagram of an illustrative embodiment of a hierarchical ontology data structure 300. The hierarchical ontology data structure 300 includes the financial instruments equities 302, debt 304, and mortgage-backed securities 306. The equity instruments 302 include the stock exchanges New York Stock Exchange (NYSE) 310, National Association of Securities Dealers Automated Quotation (NASDAQ) 312, Toronto Stock Exchange (TSE) 314, and London Stock Exchange (LSE) 316. The NYSE 310 includes the geographic areas Asia Pacific 318, North America 320, and European Union 322. The LSE 316 includes the geographic areas Asia Pacific 324, European Union 326, and North America 328.

The geographic area North America 320 of the NYSE 310 includes the industries automobile manufacturing 330, financial brokers 332, and chemical products 334. The financial brokers 332 include the companies Goldman Sachs 336, Merrill Lynch 338, and Citibank 340.

The geographic area European Union 326 of the LSE 316 includes the industries automobile manufacturing 342, financial brokers 344, and chemical products 346. The automobile manufacturing 342 includes the manufacturers Lamborghini 348, Daimler 350, and Saab 352.

A first domain 360 includes the automobile manufacturing 330, the financial brokers 332, and the chemical products 334 in North America listed as equities on the New York Stock Exchange. A second domain 362 includes the automobile manufacturers 342, the financial brokers 344, and the chemical products 346 in the European Union listed as equities on the London Stock Exchange. A third domain 364 includes all equities listed on the New York Stock Exchange.

A financial market data aggregator creates the hierarchical ontology data structure 300 and defines the domains 360, 362, and 364. Each domain corresponds to a portion of the aggregate financial market data that may be accessed via a subscription. Each domain has a corresponding authorization database (not shown). The hierarchical ontology data structure of FIG. 3 is an example of how a hierarchical ontology data structure may be organized and divided into domains. Each of the domains 360, 362, and 364 may be distinct or they may overlap.

Figure 4:
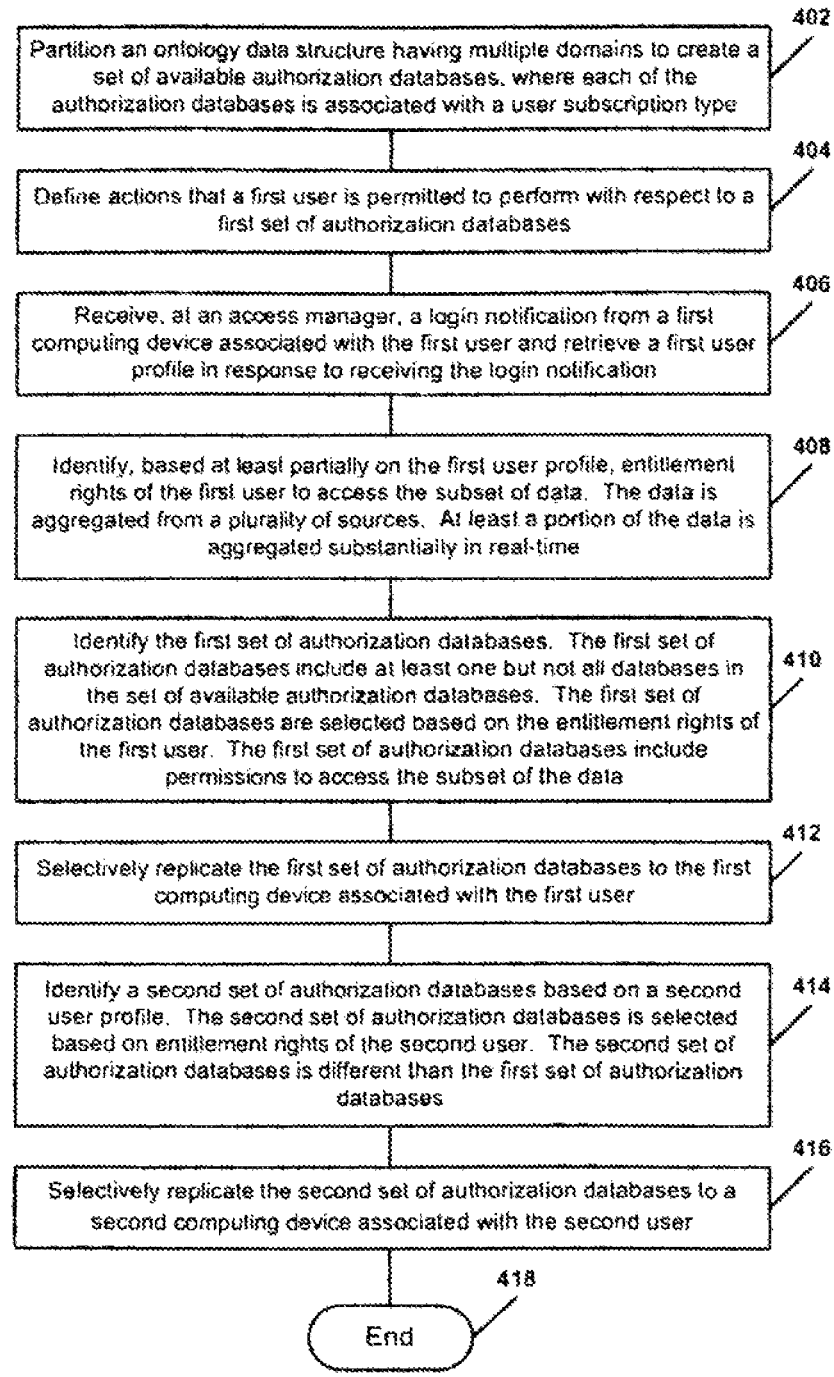
FIG. 4 is a flow diagram of a first illustrative embodiment of a method to enable access to a subset of data.

FIG. 4 is a flow diagram of a first illustrative embodiment of a method to enable access to a subset of data. The method may be performed by a policy server, such as the policy server 132, as shown in FIG. 1.

At 402, an ontology data structure having multiple domains is partitioned to create a set of authorization databases, where each of the authorization databases is associated with a user subscription type. For example, in FIG. 1, the ontology data structure 138 has multiple domains 146 and is partitioned to create the set of authorization databases 136. Proceeding to 404, actions that a first user is permitted to perform with respect to a first set of authorization databases are defined. For example, the first user may be permitted to view data but may not be permitted to analyze the data.

Continuing to 406, a login notification is received at an access manager from a first computing device associated with the first user and a first user profile is retrieved in response to receiving the login notification. For example, in FIG. 2, the policy server 220 receives the first login notification 242 from the first client terminal 202 and retrieves the first user profile 228 in response to receiving the first login notification 242. Advancing to 408, entitlement rights of the first user to access the subset of financial market data are identified based at least partially on the first user profile. The data is aggregated from a plurality of sources. At least a portion of the data is aggregated substantially in real-time. For example, in FIG. 1, the entitlements rights of the user may be identified based at least partially on the user profile 142 and based at least partially on the set of policies 144.

Moving to 410, the first set of authorization databases is identified. For example, in FIG.1, the policy server 132 identifies the first subset of authorization databases 156. The first set of authorization databases identified at 410 includes at least one but not all databases in the set of authorization databases. The first set of authorization databases is selected based on the entitlement rights of the first user. The first set of authorization databases includes permissions to access the subset of the data. For example, in FIG. 1, the first subset of authorization databases 156 may include permissions to access the subset of financial market data 122. In a particular embodiment, a first subset of the plurality of domains is associated with a second subset of the authentication databases and a third subset of the plurality of domains is associated with a fourth subset of the authentication databases.

Proceeding to 412, the first set of authorization databases is selectively replicated to the first computing device associated with the first user. For example, in FIG. 2, the first replicated subset of authorization databases 248 may be replicated to the first client terminal 202 to enable a user of the first client terminal 202 to access the first subset of financial market data 234. Continuing to 414, a second set of authorization databases is identified based on a second user profile. The second set of authorization databases is selected based on entitlement rights of the second user. The second set of authorization databases is different than the first set of authorization databases. Advancing to 416, the second set of authorization databases is selectively replicated to a second computing device associated with the second user. For example, in FIG. 2, the second replicated subset of authorization databases 250 may be replicated to the second client terminal 204 to enable a user of the second client terminal 204 to access the second subset of financial market data 236. The second subset of authorization databases may be replicated substantially simultaneously with replicating the first subset of authorization databases. The method ends, at 418.

Figure 5:
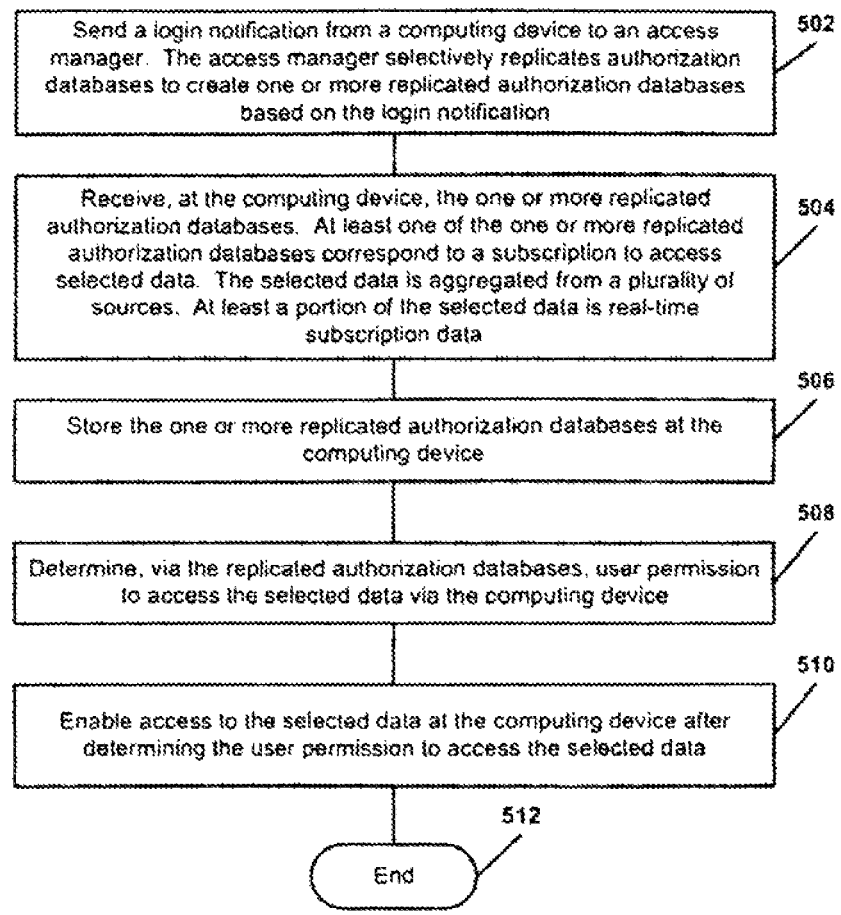
FIG. 5 is a flow diagram of a second illustrative embodiment of a method to enable access to a subset of data.

FIG. 5 is a flow diagram of a second illustrative embodiment of a method to enable access to a subset of financial market data. The method may be performed by a computing device, such as the client terminal 102, as shown in FIG. 1.

At 502, a login notification is sent from a computing device to an access manager. The access manager selectively replicates authorization databases to create one or more replicated authorization databases based on the login notification. For example, in FIG. 1, the access manager 106 identifies the first subset of authorization databases 156 based on the login notification 150 and selectively replicates the set of authorization databases 136 to create the replicated subset of authorization databases 158. Proceeding to 504, the one or more replicated authorization databases are received at the computing device. At least one of the one or more replicated authorization databases correspond to a subscription to access selected financial market data. For example, in FIG. 1, the replicated subset of authorization databases 158 corresponds to a subscription to access the subset of financial market data 122. Continuing to 506, the one or more replicated authorization databases are stored at the computing device. For example, in FIG. 1, the replicated subset of authorization databases 150 is stored at the local set of authorization databases 120. Advancing to 508, user permission to access the selected data via the computing device is determined via the replicated authorization databases. For example, in FIG. 1, when a user attempts to access the subset of financial market data 122 via the client terminal 102, the access manager runtime 118 determines whether the user is authorized to access the subset of financial market data 122 via the local set of authorization databases 120. Moving to 510, access to the selected data is enabled at the computing device after determining the user permission to access the selected financial market data. For example, in FIG. 1, after determining the user permission to access the subset of financial market data 122 via the local set of authorization databases 120, the access manager runtime 118 either grants or denies the user's request to access the subset of financial market data 122. The method ends at 512.

Figure 6:
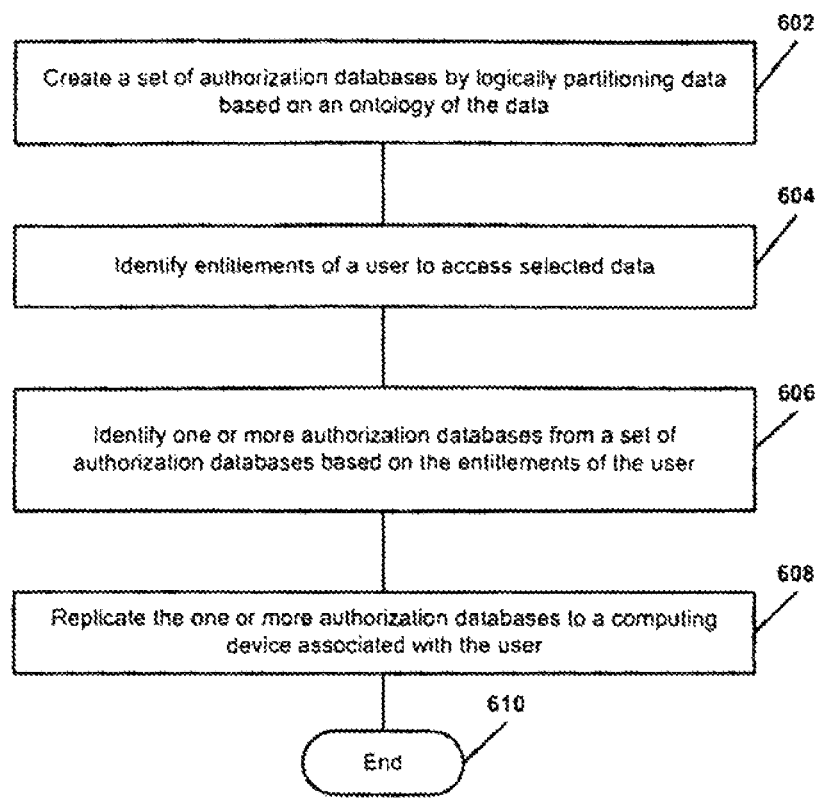
FIG. 6 is a flow diagram of a third illustrative embodiment of a method to enable access to a subset of data.

FIG. 6 is a flow diagram of a third illustrative embodiment of a method to enable access to a subset of data. The method may be performed by a policy server, such as the policy server 132, as shown in FIG. 1.

At 602, a set of authorization databases is created by logically partitioning financial market data based on an ontology of the data. For example, in FIG. 3, the ontology data structure 300 is logically partitioned into the domains 360, 362, and 364. Proceeding to 604, entitlements of a user to access selected data are identified. For example, in FIG. 1, the user entitlements may be determined by retrieving the user profile 142 from the user information database 140 of the directory services server 134. Continuing to 606, one or more authorization databases are identified from a set of authorization databases based on the entitlements of the user. For example, in FIG. 1, the first subset of authorization databases 156 may be identified from the set of authorization databases 136 based on the user profile 142. Advancing to 608, the one or more authorization databases are replicated to a computing device associated with the user. For example, in FIG. 1, the subset of authorization databases 158 may be replicated to the local set of authorization databases 120. The method ends at 610.

Figure 7:
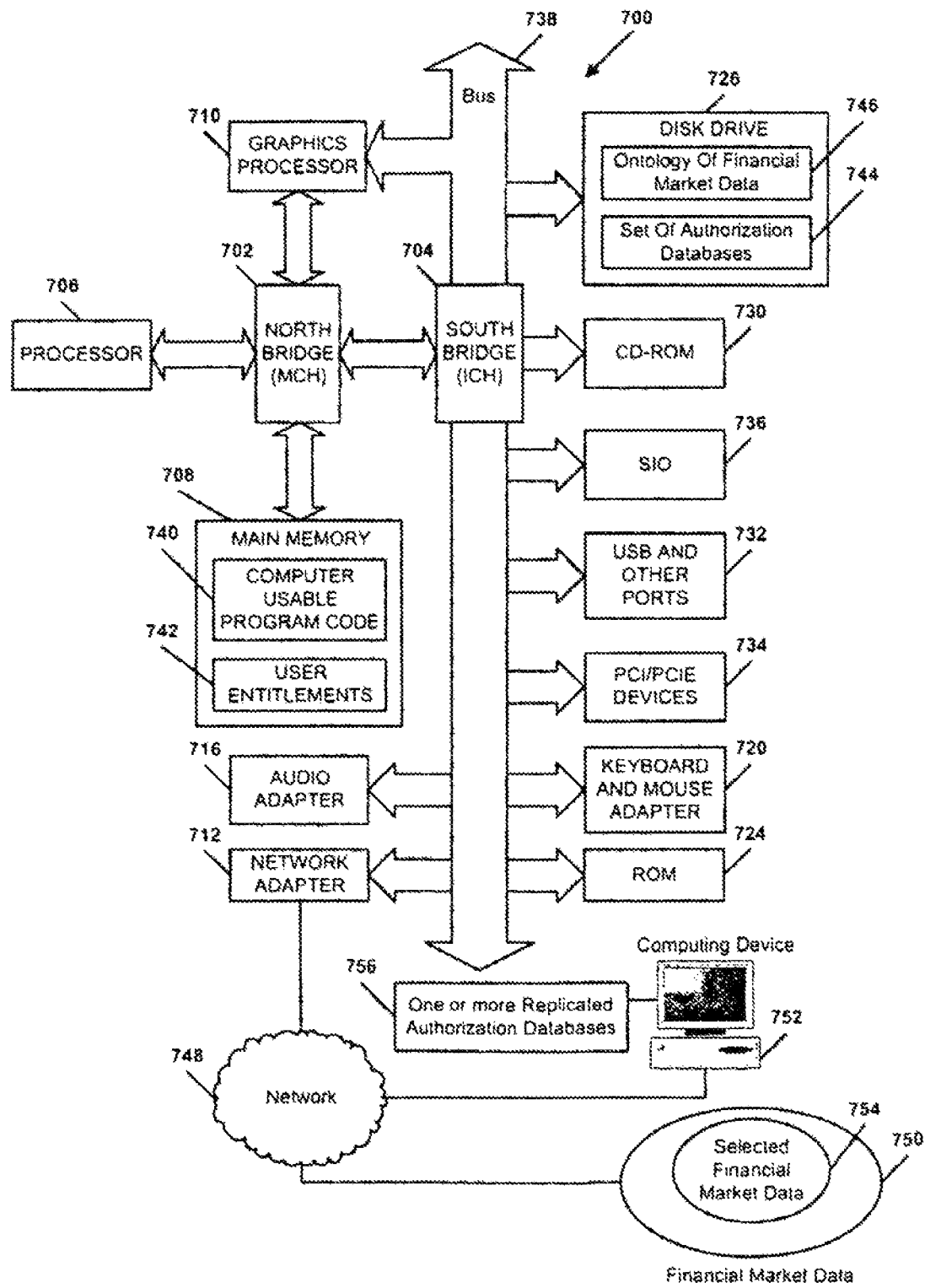
FIG. 7 is a general diagram of a computing system.

FIG. 7 is a general diagram of a computing system 700 in which systems and methods of the present disclosure may be implemented. In the depicted example, the computing system 700 employs a hub architecture including a north bridge and memory controller hub (MCH) 702 and a south bridge and input/output (I/O) controller hub (ICH) 704. A processor 706, a main memory 708, and a graphics processor 710 are coupled to the north bridge and memory controller hub 702. For example, the graphics processor 710 may be coupled to the MCH 702 through an accelerated graphics port (AGP) (not shown).

In the depicted example, a network adapter 712 is coupled to the south bridge and I/O controller hub 704 and an audio adapter 716, a keyboard and mouse adapter 720, a read only memory (ROM) 724, universal serial bus (USB) ports and other communications ports 732, and Peripheral Component Interconnect (PCI) and Peripheral Component Interconnect Express (PCIe) devices 734 are coupled to the south bridge and I/O controller hub 704 via bus 738. A disk drive 726 and a CD-ROM drive 730 are coupled to the south bridge and I/O controller hub 704 through the bus 738. The PCI/PCIe devices 734 may include, for example, Ethernet adapters, add-in cards, and PC cards for notebook computers. The ROM 724 may be, for example, a flash binary input/output system (BIOS). The disk drive 726 and the CD-ROM drive 730 may use, for example, an integrated drive electronics (IDE) or serial advanced technology attachment (SATA) interface. A super I/O (SIO) device 736 may be coupled to the south bridge and I/O controller hub 704.

The main memory 708 includes computer instructions installed onto a computer readable medium that includes computer usable program code 740. The main memory 708 also includes user entitlements 742. The disk drive 726 includes a set of authorization databases 744 and an ontology of financial market data 746. The network adapter 712 is coupled to a remote computing device 752, such as the client terminal 102, as shown in FIG. 1. The network adapter 712 is also coupled to financial market data 750 that includes selected financial market data 754.

The computer usable program code 740 is configured to create the set of authorization databases 744 by logically partitioning financial market data 750 based on the ontology of the financial market data 746. The ontology of the financial market data 716 is logically partitioned based on at least one of a stock exchange, a financial instrument class, a financial instrument type, a symbol of a financial instrument, and a geographic classification.

The computer usable program code 740 is further configured to identify user entitlements 742 to access the selected financial market data 754. The computer usable program code 740 is further configured to identify one or more authorization databases from the set of authorization databases 744 based on the user entitlements 742. The computer usable program code 740 is further configured to replicate the one or more authorization databases to create the one or more replicated authorization databases 756 at the computing device 752 associated with the user.

An operating system (not shown) runs on the processor 706 and coordinates and provides control of various components within the computing system 700. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 700 (Java and all Java-based trademarks are trademarks of Sun Microsystems, Inc. in the United States, other countries, or both).

Instructions for the operating system, the object-oriented programming system, and applications or programs are located on storage devices, such as the disk drive 726, and may be loaded into the main memory 708 for execution by the processor 706. The processes of the disclosed illustrative embodiments may be performed by the processor 706 using computer implemented instructions, which may be located in a memory such as, for example, the main memory 708, the read only memory 724, or in one or more of the peripheral devices.

The hardware in computing system 700 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the disclosed illustrative embodiments may be applied to a multiprocessor data processing system.

In some illustrative examples, portions of the computing system 700 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 708 or a cache such as found in the north bridge and memory controller hub 702. A processing unit may include one or more processors or CPUs. The depicted examples in FIG. 7 and above-described examples are not meant to imply architectural limitations. For example, portions of the computing system 700 also may be implemented in a personal computer, server, server cluster, tablet computer, laptop computer, or telephone device in addition to taking the form of a PDA.

Particular embodiments of the computing system 700 can take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments in FIGS. 1-7 can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method, comprising:
receiving, at a computing device, one or more replicated authorization databases corresponding to a subscription to access selected data, the selected data aggregated from a plurality of sources, wherein at least a portion of the selected data is real-time subscription data, and wherein the one or more replicated authorization databases comprises the selected data that is subscribed to and permissions to access the one or more replicated authorization databases;
storing the one or more replicated authorization databases at the computing device;
determining, via the permissions to access the one or more replicated authorization databases, user permission to access the selected data stored at the computing device; and
enabling access to the selected data at the computing device after determining the user permission to access the selected data via the permissions to access the one or more replicated authorization databases created from an ontology data structure having multiple domains logically partitioned based on at least one of a source of the data, a classification of the data, a type of the data, an identifier of the data, and a geographic classification of the data, and wherein each of the authorization databases is associated with a user subscription type.

2. The method of claim 1, wherein the selected data includes financial market data.

3. The method of claim 2, wherein the financial market data includes at least one of stock quotes, market analysis reports, interest rate quotes, historical financial market data, and market-related news.

4. The method of claim 1, further comprising sending a login notification from the computing device to an access manager before receiving the one or more replicated authorization databases, and wherein the access manager selectively replicates the authorization databases to create the one or more replicated authorization databases in response to the login notification.

5. The method of claim 1, further comprising defining actions that a user of the computing device is permitted to perform with respect to accessing the selected data based on the permissions to access the one or more replicated authorization databases.

6. A computer program product comprising a non-transitory computer readable storage medium having program code stored thereon that is operable, when executed by a data processor, to perform the steps of claim 1.

7. An apparatus, comprising:
a processor coupled to a storage device having instructions stored therein that are operable, when executed by the processor, to perform steps of:
receiving, at a computing device, one or more replicated authorization databases corresponding to a subscription to access selected data, the selected data aggregated from a plurality of sources, wherein at least a portion of the selected data is real-time subscription data, and wherein the one or more replicated authorization databases comprises the selected data that is subscribed to and permissions to access the one or more replicated authorization databases;
storing the one or more replicated authorization databases at the computing device;
determining, via the permissions to access the one or more replicated authorization databases, user permission to access the selected data stored at the computing device; and
enabling access to the selected data at the computing device after determining the user permission to access the selected data via the permissions to access the one or more replicated authorization databases created from an ontology data structure having multiple domains logically partitioned based on at least one of a source of the data, a classification of the data, a type of the data, an identifier of the data, and a geographic classification of the data, and wherein each of the authorization databases is associated with a user subscription type.

8. The apparatus of claim 7, wherein the selected data includes financial market data.

9. The apparatus of claim 8, wherein the financial market data includes at least one of stock quotes, market analysis reports, interest rate quotes, historical financial market data, and market-related news.

10. The apparatus of claim 7, wherein the instructions are further operable to send a login notification from the computing device to an access manager before receiving the one or more replicated authorization databases, and wherein the access manager selectively replicates the authorization databases to create the one or more replicated authorization databases in response to the login notification.

11. The apparatus of claim 7, wherein the instructions are further operable to define actions that a user of the computing device is permitted to perform with respect to accessing the selected data based on the permissions to access the one or more replicated authorization databases.

* * * * *